Figure 1:
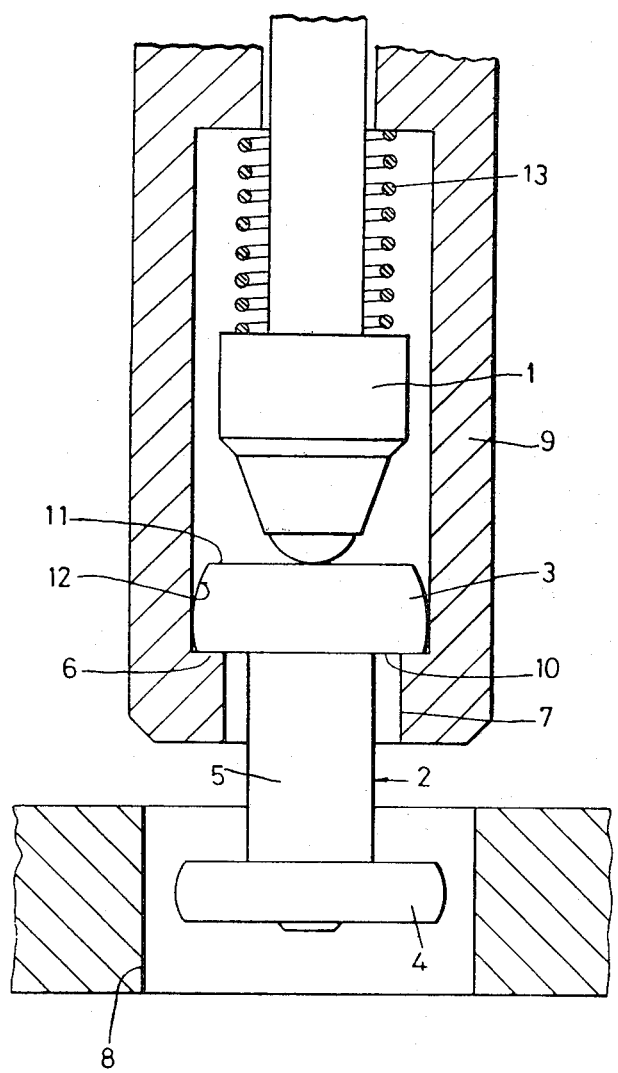

United States Patent [19]

Hauert

[11] 4,352,246
[45] Oct. 5, 1982

[54] TRACER HEAD FOR MACHINE TOOLS

[75] Inventor: Ulrich Hauert, Schnottwil, Switzerland

[73] Assignee: ETA A.G. Ebauches-Fabrik, Grenchen, Switzerland

[21] Appl. No.: 169,094

[22] Filed: Jul. 15, 1980

[30] Foreign Application Priority Data

Jul. 17, 1979 [CH] Switzerland .......................... 6644/79

[51] Int. Cl.³ .......................... G01B 7/00; G01B 7/28
[52] U.S. Cl. .................................. 33/174 L; 33/23 K
[58] Field of Search ............... 33/23 H, 23 K, 172 B, 33/172 E, 174 R, 174 L, 174 P, 174 PC

[56] References Cited

U.S. PATENT DOCUMENTS

| | | | |
|---|---|---|---|
| 3,250,012 | 5/1966 | Hilton et al. | 33/174 L |
| 3,571,934 | 3/1971 | Buck, Sr. | 33/174 L |
| 3,660,906 | 5/1972 | Zimmerman | 33/174 L |
| 3,766,653 | 10/1973 | McKay, Sr. | 33/174 L |
| 3,807,685 | 4/1974 | Girola | 33/23 K |
| 4,155,171 | 5/1979 | McMurtry | 33/174 L |

FOREIGN PATENT DOCUMENTS 1494945  8/1967  France .................. 33/174 L
598455  10/1959  Italy ..................... 33/23 K Primary Examiner—Richard R. Stearns
Attorney, Agent, or Firm—Zarley, McKee, Thomte, Voorhees & Sease

[57] ABSTRACT

The tracer head comprises a casing, an axially movable tracer and a radially movable tracer. The radially movable tracer comprises a ball head, a feeler disc and a stem connecting the ball head with the feeler disc. The ball head has the form of a ball zone, the lower flat surface of which rests on the bottom surface of the casing when the radially movable tracer is in its inoperative position. The upper surface of the ball head is a contact surface with the axially movable tracer. The ball-like circumference surface of the ball head lies free of play on the inside wall of the casing. The stem passes with a certain amount of play through a bore provided in the bottom of the casing. The axially movable tracer contacts the upper flat surface of the ball head always only in one point. By means of this a precise transfer of the tilting movements of the radially movable tracer is secured. The tracer head has a substantially smaller diameter than the known tracer heads. By means of this tracer head several distances can be measured in one measurement.

2 Claims, 3 Drawing Figures

TRACER HEAD FOR MACHINE TOOLS

The invention relates to a tracer head for machine tools mounted in the Z-axis of a measuring machine comprising a cylindrical casing, an axially movable tracer placed in said casing and movable against the action of a coil and a radially movable tracer which is separate from said axially movable tracer, the longitudinal axis of said radially movable tracer lying in the Z-axis when the radially movable tracer is in its inoperative position, said radially movable tracer further comprising a ball head having the form of a ball zone, a feeler disc to be pressed against a workpiece to be measured or a template to be contacted and a stem connecting said ball head with said feeler disc, said stem passing with a certain amount of play through a bore provided in the bottom of said casing, said ball head having a lower flat surface resting on the bottom surface of said casing, an upper flat surface forming a contact surface with said axially movable tracer and a ball-like circumference surface lying free from play on the inside wall of said casing.

The known tracer heads can carry out measurements only in the axial direction. Such a tracer head can be provided with a lever which can be encountered only laterally. A tracer equipped with such a lever can, however, carry out the measurements only in one lateral direction.

The published German patent application No. 27 12 761 describes a tracer head provided in a measuring head of a coordinate measuring machine. The tracer head comprises a tracer attached to a coil arranged in a plane running perpendicularly to the symmetrical axis of the tracer head. The deflection of the tracers when tracing a surface of a workpiece with regard to the measuring head is measured by means of four transformers.

By locating four transformers in the casing of the tracer head the tracer head becomes rather voluminous.

There is known from the published German patent application No. 1 627 123 a tracer head which can be deflected in all directions of one plane. The tracer head comprises a casing, an axially movable tracer placed in the casing and movable against the action of a coil and a radially movable tracer which is separate from the axially movable tracer. The radially movable tracer has a ball head, a feeler disc and a stem connecting the ball head with the feeler disc. The stem passes through an opening in the bottom of the casing with a certain amount of play. The lower flat surface of the ball head lies on the bottom surface of the casing when the radially movable tracer is in its inoperative position. The upper flat surface of the ball head forms a contact surface for the axially movable tracer. The circumference surface of the ball head lies on the inside wall of the casing free from play. When the feeler disc touches the inside wall of a bore of a template, the ball head will be tilted from the bottom surface of the casing and the axially movable tracer will be raised and this movement will be transferred to a gauge.

The tracer head is here used as a feeler for touching the contour of a template and for the transfer in the ratio of 1:1. Owing to the fact that the axially movable tracer contacts and presses downwardly against the upper flat surface of the ball head of the radially movable tracer, only a very small radial deflection of the radially movable tracer is possible.

It is an object of the invention to provide a tracer head by means of which a precise measurement of the tolerances of a workpiece can be carried out in order to get an exactly defined geometry. The path of measurement should be sufficiently great in order to secure the measurement of also comparatively large bores. The dimensions of such a tracer head should be small.

According to the invention the axially movable tracer is in contact with the upper surface of the ball head of the radially movable tracer in only one point lying always in the Z-axis.

It is advantageous when the ball head is movable at its one side from the bottom surface of the casing when the longitudinal axis of the radially movable tracer is deflected from the Z-axis, which movement causes a shifting of the contact point of the axially movable tracer with the upper flat surface of said ball head on the Z-axis by a distance.

Figure 3:
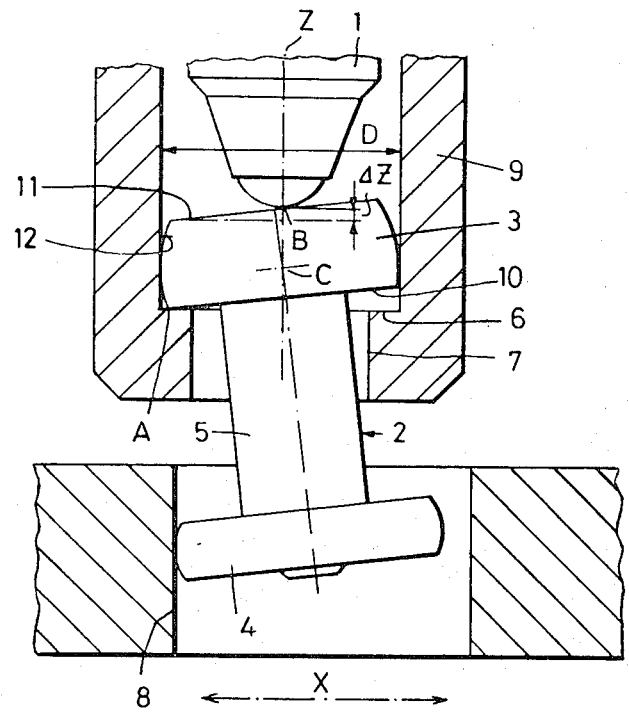
Figure 2:
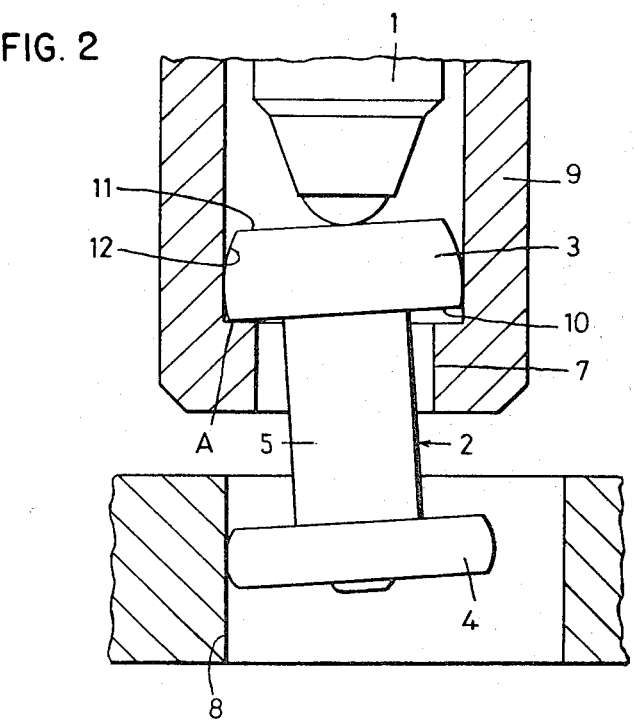

In order that the invention may be more clearly understood the same will now be more fully described with reference to the accompanying drawings, wherein FIG. 1 is a diagrammatic view of a radially movable tracer in its inoperative position, which tracer is placed in a casing of a tracer head, FIG. 2 a diagrammatic view of the radially movable tracer according to FIG. 1 which has been introduced in a comparatively large bore of a workpiece and FIG. 3 a diagramatical view of the radially movable tracer according to FIG. 1 which has been introduced in a comparatively small bore of a workpiece.

There is mounted in the Z-axis of a known measuring machine a tracer head comprising a cylindric casing 9 and a tracer 1 axially movable in the same. This tracer 1 is axially movable against the action of a coil 13 which is equally placed in the casing 9. By the axial movement of the tracer 1 signals are produced in the known manner.

In order to encounter a workpiece in any angle of the plane running perpendicularly to the Z-axis, there is further provided in the tracer head a radially movable tracer 2 which is separate from the axially movable tracer 1. The radially movable tracer 2 has a ball head 3, a feeler disc 4 and a stem 5 connecting the ball head 3 with the feeler disc 4. The ball head 3 has the form of a ball zone having a lower flat surface 10, an upper flat surface 11 and a ball-like circumference surface 12. The feeler disc 4 which serves to be pressed against the working piece 8 to be measured or against a not shown template to be traced has equally the form of a ball zone. The longitudinal axis of the feeler disc 4 as well as the ball head 3 lie perpendicularly to the Z-axis when the radially movable tracer 2 is in its inoperative position. The longitudinal axis of the radially movable tracer 2 when it is in its inoperative position, lies in the Z-axis.

There is provided in the bottom 6 of the cylindrical casing 9 a bore 7 through which the stem 5 is passed so that the ball head 3 lies inside the cylindrical casing 9 and the feeler disc 4 lies outside the cylindrical casing 9. The stem 2 passes through the bore 7 with a certain amount of play; it can have any length required. The lower flat surface 10 of the ball head 3 lies on the surface of the bottom 6 of the cylindrical casing 9 when the radially movable tracer is in its inoperative position. The upper flat surface of the ball head 3 forms a contact surface with the axially movable tracer 1. B designates a contact point of the axially movable tracer 1 with the upper flat surface 11 of the ball head 3. This point B lies always on the Z-axis. The ball-like circumference surface 12 of the ball head 3 lies free of play on the inside wall of the casing 9 because the diameter of the ball head 3 exactly corresponds with the diameter D of the inside space of the cylindrical casing 9. The exact diameter D of the inside space of the cylindrical casing 9 is very important for the accuracy of the duplication.

When a wall of a bore of a workpiece to be measured is encountered and then the workpiece is shifted for a given distance in one direction, the circumference surface of the feeler disc 4 abuts against the wall of the bore to be measured whereby the entire radially movable tracer 2 is brought out of its inoperative position. The result is that the ball head 3 will be raised on one side from the bottom surface 6 of the casing 9. Thereby the ball head 3 revolves in the point A and is raised on the other side from the bottom surface 6. The contact point B of the axially movable tracer 1 with the upper flat surface 11 of the ball head 3 is shifted in the axial direction on the Z-axis by a distance $\Delta Z$. In this way the axially movable tracer 1 is actuated and produces a signal. It is advantageous when the central point C, in which the Z-axis intersects the longitudinal axis of the deflected radially movable tracer 2 lies as low as possible.

After the measurements have been carried out the radially movable tracer 2 will be brought from its deflected position into its normal position by the axially movable tracer 1 which is pressed in the downward direction by means of the coil.

The procedure of comparing a workpiece with one or two templates is as follows. The radially movable tracer 2 will be introduced into the bore of an annular template corresponding with the upper tolerance. The radially movable tracer 2 or the workpiece will be moved in the X-axis by means of a cross slide of the measuring machine till the feeler disc 4 comes into contact with the wall of the bore and is slightly pressed out of its inoperative position. The position of the cross slide and the value shown by the axially movable tracer 1 will be registered. The tracer 2 will now be moved in the opposite direction (of 180°) in the minus X-axis till the feeler disc 4 is pressed again out of its inoperative position. Both the values of the cross slide as well as the feeler disc are equally registered. The cross slide will be brought again in the central position (starting position), whereafter it will be moved in a not shown Y-axis till the feeler disc 4 comes into contact with the wall of the bore and is slightly pressed out of its inoperative position. The values of the cross slide as well as the feeler disc are again registered. The same will be then carried out in the opposite direction in the minus Y-axis. In this way the upper tolerance of the bore to be measured is recorded.

The same procedure will be repeated in order to get the lower tolerance of the respective annular template recorded whereby the four values have to be established on the machine table in the same way as during the first calibration.

In case a workpiece is clamped instead of the templates and the measuring procedure is carried out in the way as stated above, it can be easily analytically ascertained by comparing the actual values with the desired values, whether the workpiece is within the tolerances. Furthermore, the central point or its deviation from the required value and also the direction onto the X-Y-plane can be analytically determined.

It is further possible to measure several bores at the same time by using the respective templates and to analytically determine the distances of their axes.

By means of the above described tracer head precise measurements can be carried out in seconds. Two distances and diameters can be measured in one measuring procedure. The dimensions of the above mentioned tracer head are small in comparison with the known tracer heads; the diameter of the above mentioned tracer head measures 12 mm or it can be even smaller.

What we claim is:

1. A tracer head for machine tools mounted in the Z-axis of a measuring machine comprising a cylindrical casing, an axially movable tracer placed in said casing and movable against the action of a coil and a radially movable tracer which is separate from said axially movable tracer, the longitudinal axis of said radially movable tracer lying in the Z-axis when the radially movable tracer is in its inoperative position, said radially movable tracer further comprising a ball head having the form of a ball zone, a feeler disc to be pressed against a workpiece to be measured or a template to be contacted and a stem connecting said ball head with said feeler disc, said stem passing with a certain amount of play through a bore provided in the bottom of said casing, said ball head having a lower flat surface resting on the bottom surface of said casing, an upper flat surface forming a contact surface with said axially movable tracer and a ball-like circumference surface lying free from play on the inside wall of said casing, wherein the axially movable tracer contacts the upper flat surface of the ball head of the radially movable tracer only in one point lying always in the Z-axis.

2. The tracer head according to claim 1, wherein the ball head is movable at its one side from the bottom surface of the casing when the longitudinal axis of the radially movable tracer is deflected from the Z-axis, which movement causes a shifting of the contact point of the axially movable tracer with the upper flat surface of said ball head on the Z-axis by a distance.

* * * * *